United States Patent [19]

Rouyer et al.

[11] Patent Number: 5,556,326
[45] Date of Patent: Sep. 17, 1996

[54] FLOATING ROTARY DRIVE DEVICE OF A WORKPIECE TO BE MACHINED BY GRINDING

[75] Inventors: Louis Rouyer, Clamart; Jacques Bastin, Sainte Genevieve des Bois, both of France

[73] Assignee: Createc Rollers, Sainte-Genevieve-des-Bois, France

[21] Appl. No.: 211,507

[22] PCT Filed: Oct. 2, 1992

[86] PCT No.: PCT/FR92/00915

§ 371 Date: Jul. 18, 1994

§ 102(e) Date: Jul. 18, 1994

[87] PCT Pub. No.: WO93/06966

PCT Pub. Date: Apr. 15, 1993

[30] Foreign Application Priority Data

Oct. 2, 1991 [FR] France .................................. 91 12123

[51] Int. Cl.⁶ ...................................................... B24B 41/06
[52] U.S. Cl. .......................... 451/246; 451/460; 451/379; 451/408
[58] Field of Search ..................................... 451/246, 365, 451/379, 385, 398, 406, 408, 460, 403; 279/156; 82/155, 156, 162, 165, 168–170

[56] References Cited

U.S. PATENT DOCUMENTS

| 2,784,534 | 3/1957 | Townsend et al. ......................... 51/103 |
| 3,222,825 | 12/1965 | Seidel ........................................ 51/215 |
| 4,463,635 | 8/1984 | Hafla et al. ................................. 82/162 |
| 4,650,237 | 3/1987 | Lessway ..................................... 82/162 |

FOREIGN PATENT DOCUMENTS

| 0076419 | 4/1983 | European Pat. Off. . |
| 1274404 | 9/1961 | France . |
| 232685 | 9/1944 | Germany . |
| 499368 | 1/1971 | Switzerland . |
| 0674837 | 7/1979 | U.S.S.R. ................................ 279/156 |

*Primary Examiner*—Robert A. Rose
*Attorney, Agent, or Firm*—Schweitzer Cornman & Gross

[57] ABSTRACT

A floating rotary drive device sequentially holding a workpiece of a series of workpieces to be supported with slack while each workpiece is machined by grinding while the workpiece is rotated about a slack axis of rotation, comprising a motor having n output shaft, a chuck (2) rotatable about an axis of rotation which chuck is attached to the output shaft of the motor (9), by a flexible control (30) and positioning means for positioning the machined workpiece after it has been ground, characterized in that the device comprises: coupling means (14, 39; 15, 40) for automatic coupling of the workpiece to be ground with the chuck; the coupling means being actuatable at the end of a machining operation to bear against the chuck to center the chuck with its axis of rotation coincident with the specific axis of rotation of the machined workpiece in a final position and to immobilize the chuck in the final position during the removal of the machined workpiece and during the fitting of a sequential workpiece to be machined; the coupling means being subsequently actuatable to free the chuck from immobilization after the fitting of a subsequent workpiece to be machined to ensure slack when the subsequent workpiece is subjected to grinding.

8 Claims, 2 Drawing Sheets

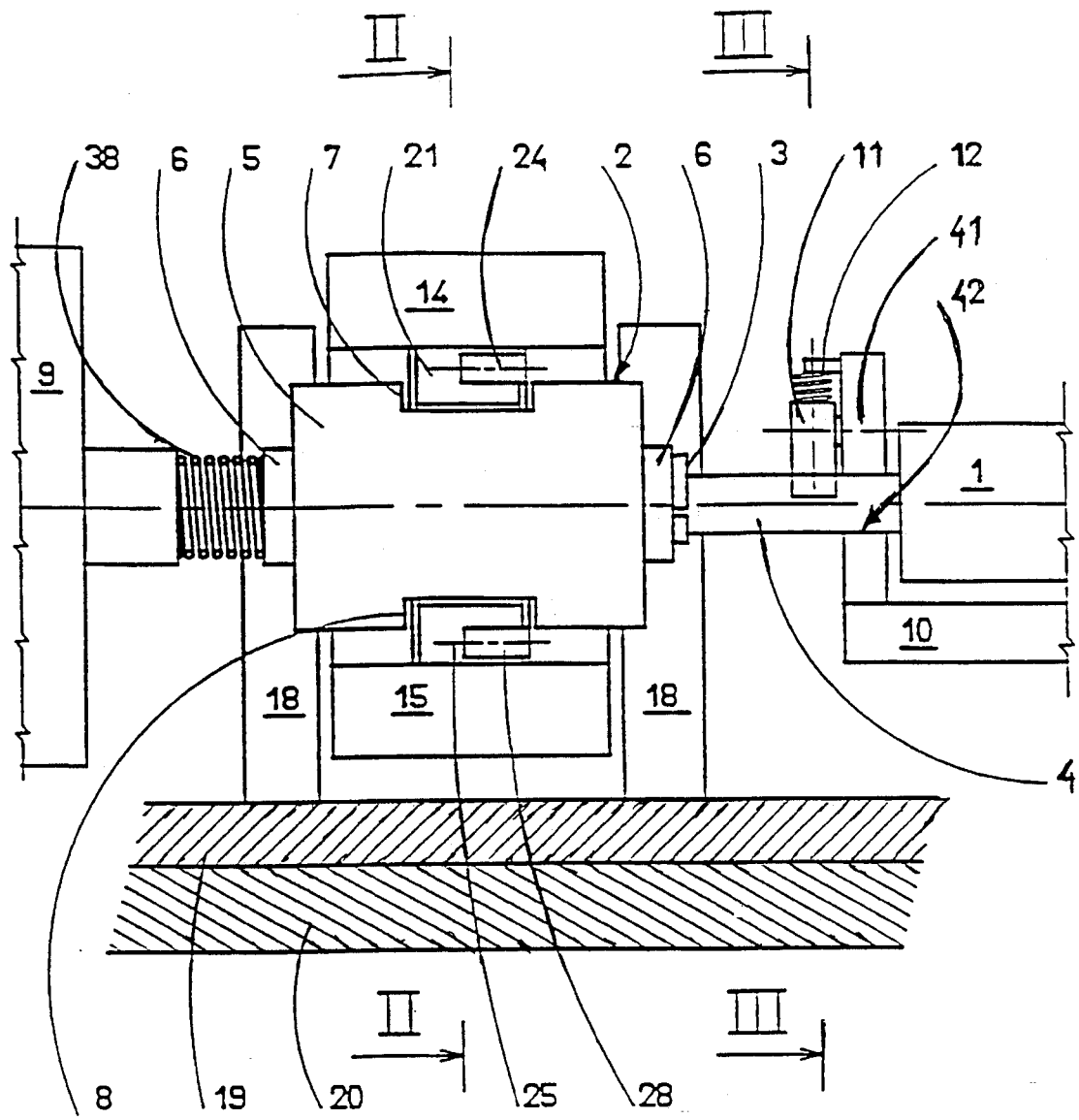
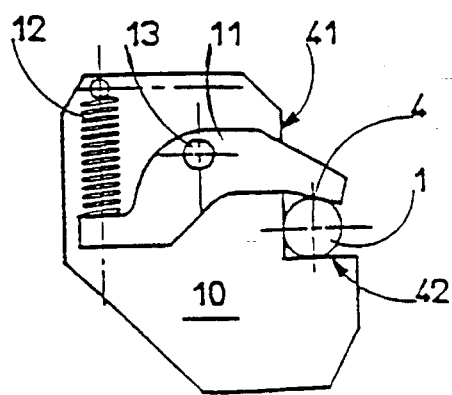

FLOATING ROTARY DRIVE DEVICE OF A WORKPIECE TO BE MACHINED BY GRINDING

BACKGROUND OF THE INVENTION

The present invention relates to a floating rotary drive device for a workpiece to be machined by grinding, of the type comprising a chuck securely attached, by a flexible control, to the output shaft of a motor and to means for positioning the said workpiece machining of which is completed.

In the machining by "plunge" grinding of some materials, particularly resilient or semi-resilient, it may be advantageous to give some slack to the workpiece in the course of machining and/or surfacing.

Such slack can be obtained only by a supple connection between motor and workpiece to be machined and this necessarily means variations in the relative positioning of the workpiece in the course of machining and of the drive device.

Now, although it is relatively simple to reposition rigorously, at rest, the workpiece machining of which is completed, for example with a device with springs coming to press the two ends of the shaft of the said workpiece against two stops having a definite position, the same is not true of the intermediate drive system between the motor device and the workpiece, even repositioned. In fact, at the moment of stopping, the position of this device remains random in the space where it has to move in order to permit the desired slack of the workpiece in the course of machining. Moreover, after release of the workpiece machining of which is completed, its supple connection with the motor does not even allow it to keep the same position.

The consequence is an absence of constant repetitive positions allowing an automation, by simple mechanization, of the operations of coupling with the new workpiece to be machined.

Moreover, it is plain that every workpiece must be coupled with this drive device so that it can be machined, and then released after machining.

SUMMARY OF THE INVENTION

The present invention has as its subject a device making it possible to solve the problem of the automatic coupling of workpieces to be machined by grinding with a floating drive device, as much with respect to the relative positioning between the latter and the workpiece to be machined as with respect to the construction of their mechanical connection.

The device according to the invention is essentially characterized in that it comprises means for automatic coupling of the said workpiece with the said chuck the means being actuatable at the end of a machining operation in order to come to bear against the said chuck in order to centre the said chuck so that its axis of rotation is merged with the axis of rotation of the workpiece machining of which is completed, and to immobilize the said chuck in this position during the removal of the workpiece machining of which is completed, and the fitting of a new workpiece, the said coupling means being actuatable so as to free the said chuck from the time of this fitting in order to permit the desired slack of the next workpiece to be machined.

According to a further feature of the invention, the gripping means are constituted by a fixed frame bearing several elements disposed circularly and defining between them a free space which corresponds to the set of positions which the drive device may have during the machining, the said elements being capable of drawing radially nearer to one another in the manner of a diaphragm so as to come to imprison the said drive system in a position where its longitudinal axis will be merged with that of the workpieces positioned after machining.

In a simplified embodiment of the invention, the gripping means are constituted by a clamp with at least one element which is articulated on a fixed point and comprises a jaw, the working surface of which has a profile comprising at least two parts slanting in opposition to one another so that the device for driving the workpieces in machining is placed automatically in the hollows of the Vs formed by the jaws and is thus positioned in precise manner with respect to the articulation of the said elements.

In a variant embodiment, the clamp comprises at least two elements articulated and provided with jaws with V-shaped working surface.

According to an advantageous feature of the invention, each element bearing a jaw is articulated on a fixed point different from the other so as to reduce the lever arm for application of the force exerted and to bring closer together the direction of the two forces of opposite senses applied to the drive device gripped and thus to reduce the energy losses.

According to a further feature of the invention, at least one jaw is fitted with a lock which interacts with a keeper provided on the drive device so as to replace the axial immobilization efforts of the latter by a mechanical blocking and thus to economize on the energy necessary for this immobilization.

According to a further feature, advantageous on the economic level, of the invention, the two jaws are identical and actuated by links also identical operated by a single jack.

Other features will become apparent in the course of the following description of an example, given as a by no means limitative indication, of an embodiment of the which:

DESCRIPTION OF DRAWINGS

FIG. 1 shows a device for driving the shaft of a workpiece to be machined according to the invention;

FIG. 3 is a partial cross-section along the line III—III of FIG. 1.

In FIG. 1, the device for driving the workpiece 1 to be machined comprises a chuck 2 composed of an outer body 5 and of an inner part 6.

Figure 2:
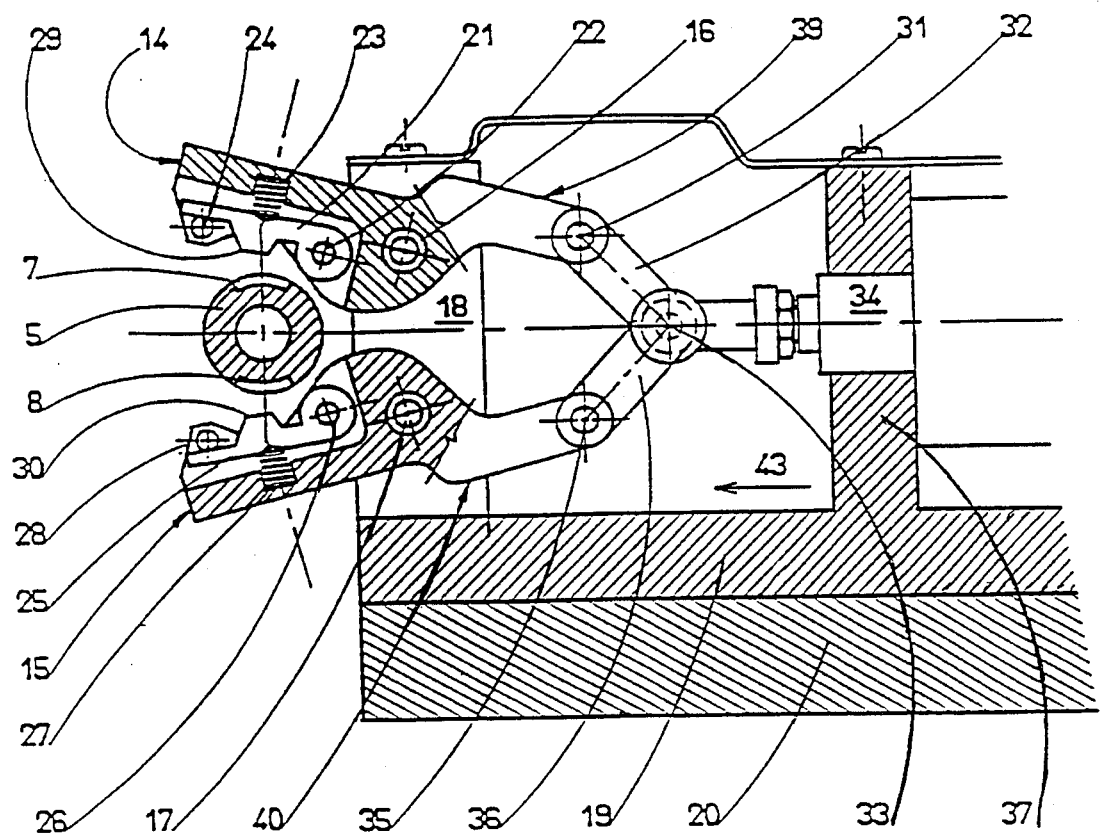
FIG. 2 is a cross-section along the line II—II of FIG. 1.

Two recesses 7 and 8, performing the function of keepers, are provided on the outer body 5, whereas the inner part 6 bears, at one of its ends, three jaws 3 designed to grip the shaft 4 of the workpiece 1. The radial movement of these jaws for tightening or loosening is obtained conventionally by relative rotation of the outer body 5 and of the inner part 6.

By its other end, the inner part 6 is securely attached to a flexible control constituted by a spring 38 itself securely attached to the output shaft of a single motor 9 which serves both to drive in rotation the workpiece 1 and to tighten and loosen the jaws 3 of the chuck 2, as will be explained further on.

The shaft 4 of the workpiece 1 is maintained on a part 10 comprising two surfaces at right angles 41 and 42 (see FIG.

3), by virtue of the action of a spring 12, through a lever 11 articulated at 13 on the part 10.

In line with the central part of the outer body 5 is a clamp constituted by two elements 39 and 40 the detail of which appears in FIG. 2.

The element 39 comprises a jaw 14 and is articulated on a fixed pin 16 disposed on two upright [sic]18 of a frame 19 borne by a bedplate 20.

The jaw 14 has a working surface constituted by two parts slanting with respect to one another so as to form a sort of V, and bears a lock 21 articulated at 22 and subject to the action of a spring 23.

The lock 21 is limited in its travel by a stop 24 and bears, in line with the recesses 7 and 8 of the body 5 of the chuck 2, a catch 29 disposed in the hollow of the V formed by the working surface of the jaw 14.

The element 40 comprises a jaw 15 and is articulated on a fixed pin 17 disposed on the two uprights 18 of the frame 19;

The jaw 15 is identical to the jaw 14 with a V-shaped working surface and bears a lock 25 articulated at 26 and subjected to the action of a spring 27.

Like the lock 21, the lock 25 is limited in its travel by a stop 28, and bears, in line with the recesses 7 and 8, a catch disposed in the hollow of the V formed by the working surface of the jaw 15.

The end of the element 39 opposite the jaw 14 with respect to the pin 16, is articulated at 31 on one of the ends of a link 32 the other end of which is articulated at 33 on the head of a jack 34 which is positioned in precise manner on an upright 37 of the frame 19.

Similarly, the end of element 40 opposite the jaw 15 with respect to the pin 17 is articulated at 35 on one of the ends of a link 36 the other end of which is articulated at 33 on the head of the jack 34.

In these conditions, the operation is set up as explained hereinafter.

When a machining cycle is completed, the situation shown in FIGS. 1 and 3 prevails, that is to say that, by virtue of the action of the levers 11, the shaft 4 is found to be bearing against the surfaces 41 and 42 of the parts 10.

But the same is not true of the chuck 2, the position of which, at the moment of stoppage, will be any one of the various positions which it must adopt in order to permit the slack of the workpiece in the course of being machined. Moreover, its mechanical connection with the shaft of the motor 9 being a supple connection, it can only fall back when the machined workpiece is released.

This is why, upon completion of the machining, the head of jack 34 advances in the direction of the arrow 43, opening the angle formed by the links 32 and 36 and thus bringing closer together the working surfaces of the jaws 14 and 15.

Taking into account the V-shape, these working surfaces grip the body 5 of the chuck 2 centering it with respect to the hollows of the Vs and thus positioning it so that its longitudinal axis is merged with the axis of rotation of the workpiece 1 at the end of machining.

Depending on the angular position of the outer body 5 of the chuck 2 at the moment of stoppage, the catches 29 and 30 of the locks 21 and 25 may be situated facing the recesses 7 and 8, in which case the springs 23 and 27 will cause them to enter these recesses. In the opposite case, they are retracted, the said springs being compressed by the pressure exerted on the outer body 5 by the jaws 14 and 15.

When the chuck 2 is maintained in the desired position by the jaws 14 and 15, the motor 9 is started, at slow speed in order to drive the inner part 6 in rotation without driving the outer body 5, and in order thus to obtain the loosening of the shaft of the machined part.

It is here that the catches 29 and 30 and the recesses 7 and 8 come into play.

If the former are in the latter, the latter serve as keepers and interact with the catches in order to block the outer body 5 angularly, so as to obtain a rotation of the inner part 6 alone with a view to freeing the shaft 4 of the machined workpiece.

If, on the contrary, the catches are bearing against the full periphery of the outer body, the latter can be driven in rotation by the friction existing with the inner part 6. In this case the jaws 14 and 15 being fixed as also the catches which they bear, the recesses 7 and 8 will, before a half-revolution of the outer body 5, come into line with the said catches which will enter them under the effect of the springs 23 and 27, ensuring mechanically an angular blocking of the outer body 5 more economical than a blocking obtained by gripping of the jaws 14 and 15.

When the shaft of the machined workpiece is freed, the motor 9 stops and the workpiece is withdrawn and replaced by another in the same position, that is to say bearing against the surfaces 41 and 42, with one end of its jaws 4 placed between the jaws 3 of the chuck 2.

The motor 9 is then started at slow speed, and in reverse rotation, so as to bring about the tightening of the shaft 4 of the new workpiece by a movement, also reverse, of the inner part 6.

When this tightening is executed, the jack head 34 moves back in opposite direction to the arrow 43, which frees the chuck 2 from the grip of the jaws 14 and 15.

The machining of the new workpiece can then take place and, upon completion of machining, a new cycle can restart all the stages of which, as shown by the preceding description, can be easily automated since it is a question of elementary operations to be carried out on objects positioned in precise manner.

Of course it is possible, without going beyond the scope of the invention, to modify constructional and/or functional details in order to obtain the same results.

For example, the supple control of the chuck 2 could be replaced by a universal joint.

For example, also, the catches ensuring the angular immobilization of the outer body of the chuck with a view to the release of the workpiece machining of which is completed, and with a view to the coupling of the new workpiece, could be replaced by two reversed ratchet wheels or even by at least two diagonally opposed flats permitting an ad hoc immobilization with a key.

We claim:

1. A floating rotary drive device sequentially holding a workpiece of a series of workpieces to be supported with slack while each workpiece is machined by grinding while the workpiece is rotated about a slack axis of rotation, comprising a motor having an output shaft, a chuck (2) rotatable about an axis of rotation which chuck is attached to the output shaft of the motor (9), by a flexible control (30) and positioning means for positioning the machined workpiece after it has been ground, characterized in that the device comprises:

(a) coupling means (14, 39; 15, 40) for automatic coupling of the workpiece to be ground with the chuck;

(b) the coupling means being actuatable at the end of a machining operation to bear against the chuck to center the chuck with its axis of rotation coincident with the specific axis of rotation of the machined workpiece in a final position and to immobilize the chuck in the final position during the removal of the machined workpiece and during the fitting of a sequential workpiece to be machined;

(c) the coupling means being subsequently actuatable to free the chuck from immobilization after the fitting of a subsequent workpiece to be machined to ensure slack when the subsequent workpiece is subjected to grinding.

2. Device according to claim 1, characterized in that the said coupling means comprise several parts (39,40) borne by a fixed frame (18) and disposed around a free space at least equal to the set of final positions which the drive device may have upon completion of machining, the said parts being capable of moving towards an axis fixed with respect to the said frame.

3. Device according to claim 2, characterized in that the said parts (39,40) constitute a clamp with at least one jaw (14,15) articulated on a point (16,17) fixed with respect to the frame (18) which bears it, the working support of the said jaw having at least two surfaces slanting in opposition to one another.

4. Device according to claim 3, characterized in that it comprises a clamp with at least two symmetrical jaws (14,15).

5. Device according to claim 4, characterized in that each jaw is articulated on a fixed point different from the other.

6. Device according to claim 1 characterized in that the chuck comprises an outer body (5) and a grip holder (6) securely attached by the flexible control (38) to the output shaft of the motor, the said device comprising means for angular blocking of the outer body (5) of the chuck.

7. Device according to claim 6, characterized in that the blocking means comprise at least one lock (21,25) mounted on at least one jaw (14,15) and which interacts with a keeper (7,8) provided on the outer body (5) of the chuck (2) in order to block it in angular position.

8. Device according to any one of claim 3, characterized in that it comprises two jaws (14,15) identical and actuated by links (32,36), also identical, operated by a single jack (34).

* * * * *